(12) United States Patent
Hwang et al.

(10) Patent No.: US 10,198,568 B2
(45) Date of Patent: Feb. 5, 2019

(54) TERMINAL AND METHOD FOR RELEASING LOCKING STATE OF TERMINAL

(71) Applicant: SAMSUNG ELECTRONICS CO., LTD., Suwon-si (KR)

(72) Inventors: Seong-taek Hwang, Pyeongtaek-si (KR); Chang-yeong Kim, Seoul (KR); Yun-je Oh, Seongnam-si (KR); Sun-tae Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 15/109,850

(22) PCT Filed: Jan. 6, 2015

(86) PCT No.: PCT/KR2015/000100
§ 371 (c)(1),
(2) Date: Jul. 6, 2016

(87) PCT Pub. No.: WO2015/102466
PCT Pub. Date: Jul. 9, 2015

(65) Prior Publication Data
US 2016/0335428 A1    Nov. 17, 2016

(30) Foreign Application Priority Data

Jan. 6, 2014 (KR) ........................ 10-2014-0001502

(51) Int. Cl.
*G06F 21/36* (2013.01)
*G06F 3/0482* (2013.01)
*G06F 3/0488* (2013.01)

(52) U.S. Cl.
CPC ............ *G06F 21/36* (2013.01); *G06F 3/0482* (2013.01); *G06F 3/0488* (2013.01)

(58) Field of Classification Search
CPC ....... G06F 21/36; G06F 3/0482; G06F 3/0488
(Continued)

(56) References Cited

U.S. PATENT DOCUMENTS 5,952,959 A * 9/1999 Norris ................. G01C 21/20
342/357.34
8,385,885 B2   2/2013 Hainzl
(Continued)

FOREIGN PATENT DOCUMENTS

CN    101634925 A    1/2010
CN    102707892 A    10/2012
(Continued)

OTHER PUBLICATIONS

Communication dated Jul. 27, 2017, from the European Patent Office in counterpart European Application No. 15733162.0.
(Continued)

*Primary Examiner* — Kambiz Zand
*Assistant Examiner* — Aubrey H Wyszynski
(74) *Attorney, Agent, or Firm* — Sughrue Mion, PLLC

(57) ABSTRACT

Disclosed embodiments relate to a terminal having improved security and a method of releasing a locked state of a terminal. There is provided a terminal, including an input unit configured to receive dragging; a storage unit configured to store a password pattern; a control unit configured to compare the received dragging with the password pattern and release a locked state of the terminal according to the comparison result; and an output unit configured to display at least a part of a user interface including at least two markers arranged in a grid, wherein the user interface includes a first marker and a second marker, and the password pattern includes movement from the first marker to the second marker and movement from the second marker to the first marker.

15 Claims, 13 Drawing Sheets

(58) Field of Classification Search
USPC .......................................................... 726/18
See application file for complete search history.

(56) References Cited

U.S. PATENT DOCUMENTS

| | | | | |
|---|---|---|---|---|
| 2009/0083847 | A1* | 3/2009 | Fadell | G06F 21/316 |
| | | | | 726/16 |
| 2009/0253410 | A1 | 10/2009 | Fitzgerald et al. | |
| 2009/0289916 | A1 | 11/2009 | Dai | |
| 2010/0056254 | A1* | 3/2010 | Jackson | G07F 17/32 |
| | | | | 463/20 |
| 2011/0316797 | A1 | 12/2011 | Johansson | |
| 2012/0302167 | A1 | 11/2012 | Yun et al. | |
| 2013/0067376 | A1 | 3/2013 | Kim et al. | |
| 2013/0139226 | A1 | 5/2013 | Welsch et al. | |
| 2013/0229367 | A1* | 9/2013 | Pinch | G06F 21/36 |
| | | | | 345/173 |

FOREIGN PATENT DOCUMENTS

| | | |
|---|---|---|
| CN | 103491243 A | 1/2014 |
| EP | 2506183 A1 | 10/2012 |
| KR | 1020100062900 A | 6/2010 |
| KR | 1020130028238 A | 3/2013 |
| KR | 1020130043809 A | 5/2013 |

OTHER PUBLICATIONS

Communications (PCT/ISA/210 & 237) dated Mar. 30, 2015, issued by the International Searching Authority in counterpart International Application No. PCT/KR2015/000100.

Filip, "Create Custom Unlock Pattern—LockScreen for iPhone", Feb. 19, 2013, https://web.archive.org/web/20130519203307/http://www.jailbreakmodo.com/create-custom-unlock-pattern-lockscreen-for-iphone.html, Total 4 pages.

Communication dated Jul. 6, 2018, issued by the State Intellectual Property Office of P.R. China in counterpart Chinese Application No. 201580008860.2.

* cited by examiner

TERMINAL AND METHOD FOR RELEASING LOCKING STATE OF TERMINAL

TECHNICAL FIELD

Disclosed embodiments relate to a terminal having improved security and a method of releasing a locked state of a terminal.

BACKGROUND ART

With the development of communication technology and miniaturized electronic devices, personal terminals are being spread among general consumers. For example, personal computers and laptop computers are being widely spread. In particular, in recent years, personal handheld terminals such as a smartphone and a smart tablet have been widely spread.

In general, a personal terminal may be used by one user. Private information of a user may be stored in a personal terminal. Therefore, when a person other than the user accesses the terminal, privacy of the user may be invaded.

In order to prevent private information of a user from being accessed by a person, a terminal may be in a locked state while the user does not use the terminal. When the terminal is in a locked state, functions of the terminal may be restricted. When the terminal is in a locked state, a lock screen may be displayed.

When the terminal is in a locked state, the user may input a password that is registered in advance and thus release the locked state. When the user inputs a password, if a person near the user steals a password that the user inputs, the person may know the password. When the person releases a locked state of the terminal using the password, privacy of the user may be invaded.

DETAILED DESCRIPTION OF THE INVENTION

Technical Problem

According to the disclosed embodiment, it is possible to provide a terminal having improved security and method of releasing a locked state of a terminal.

According to the embodiments, it is possible to provide a terminal and a method of releasing a locked state of a terminal through which, even when a person steals a password that a user inputs in order to release a locked state of the terminal, the person may not easily recognize the password.

Technical Solution

A terminal according to an embodiment may include an input unit configured to receive dragging; a storage unit configured to store a password pattern; a control unit configured to compare the received dragging with the password pattern and release a locked state of the terminal according to the comparison result; and an output unit configured to display at least a part of a user interface including at least two markers arranged in a grid, wherein the user interface includes a first marker and a second marker, and the password pattern includes movement from the first marker to the second marker and movement from the second marker to the first marker.

The first marker and the second marker among the markers included in the user interface may be adjacent to each other.

When each movement included in the received dragging corresponds to each movement included in the password pattern, the control unit may release a locked state of the terminal.

A terminal according to another embodiment includes an input unit configured to receive dragging; a storage unit configured to store a password pattern; a control unit configured to compare the received dragging with the password pattern and release a locked state of the terminal according to the comparison result; and an output unit configured to display at least a part of a user interface including at least two markers arranged in a grid, wherein the user interface includes a first marker and a second marker having different visibility from the first marker, and the password pattern includes movement from the first marker to the second marker.

The first marker may have a first form and the second marker may have a second form that is different from the first form.

The user interface may include the at least two first markers that are arranged in a grid and the user interface may include the second marker that is arranged between two adjacent first markers among the first markers.

The output unit may display both the first marker and the second marker.

The output unit may display one of the first marker and the second marker, and the output unit may not display the other of the first marker and the second marker.

The user interface may include markers that are arranged in a 5×5 grid.

One of the first marker and the second marker may include two concentric circles and the other of the first marker and the second marker may include one circle.

A terminal according to still another embodiment includes an input unit configured to receive dragging; a storage unit configured to store a password pattern; a control unit configured to calculate similarity between the received dragging and the password pattern, compare the calculated similarity with reference similarity, and release a locked state of the terminal according to the comparison result; and an output unit configured to display at least a part of a user interface including at least two markers, wherein the user interface includes a first marker and a second marker that is different from the first marker, the received dragging corresponds to a first trajectory from the first marker to the second marker, the first trajectory includes the at least two markers, and the control unit calculates the similarity using at least one of a direction of the first trajectory, a position of the marker included in the first trajectory, and the number of markers included in the first trajectory.

The user interface may include a third marker and a fourth marker that is different from the third marker, the password pattern may correspond a second trajectory from the third marker to the fourth marker, and the second trajectory may include the at least two markers.

The control unit may calculate first similarity between a direction of the first trajectory and a direction of the second trajectory, the control unit may calculate second similarity between a distribution of positions of the markers included in the first trajectory and a distribution of positions of the markers included in the second trajectory, the control unit may calculate third similarity between the number of markers included in the first trajectory and the number of markers included in the second trajectory, and the control unit may calculate the similarity by calculating a weighted sum of the first similarity, the second similarity and the third similarity.

A terminal according to yet another embodiment includes an input unit configured to receive dragging; a storage unit configured to store a password pattern; and a control unit configured to calculate similarity between the received dragging and the password pattern and release a locked state of the terminal according to the calculated similarity, wherein the control unit calculates the similarity using a distance between a feature vector extracted from the received dragging and a feature vector extracted from the password pattern.

When the distance is equal to or smaller than a reference distance, the control unit may release a locked state of the terminal.

A terminal according to yet another embodiment includes an input unit configured to receive dragging; a storage unit configured to store a password pattern; a control unit configured to compare the received dragging with the password pattern and release a locked state of the terminal according to the comparison result; and wherein the password pattern includes first movement and second movement that is different from the first movement, and a start point of the first movement is the same as a start point of the second movement and an end point of the first movement is the same as an end point of the second movement.

A method of releasing a locked state of a terminal according to an embodiment includes displaying at least two markers on a display; receiving dragging; comparing the received dragging with a password pattern; and releasing a locked state of the terminal according to the comparison result, wherein the displaying of the markers on the display includes displaying a first marker and a second marker, and wherein the password pattern includes movement from the first marker to the second marker and movement from the second marker to the first marker.

Advantageous Effects of the Invention

According to the disclosed embodiments, it is possible to improve security of a terminal.

In addition, according to the embodiments, even when a person steals a password that a user inputs in order to release a locked state of the terminal, the person may not easily recognize the password.

BEST MODE

Mode of the Invention

Advantages and features of the present invention, and methods of achieving the same will be clearly understood with reference to the accompanying drawings and the following detailed embodiments. However, the present invention is not limited to the embodiments to be disclosed, but may be implemented in various different forms. The embodiments are provided in order to fully explain the present invention and fully explain the scope of the present invention for those skilled in the art. The scope of the present invention is defined by the appended claims. Meanwhile, the terms used herein are provided to only describe embodiments of the present invention and not for purposes of limitation. The same reference numbers denote the same elements throughout this specification.

It will be understood that, although the term "first" or "second" may be used to describe various elements, these elements should not be limited by these terms. These terms are only used to distinguish one element from another. Therefore, the first element mentioned below may be a second element within the scope of the present invention.

Meanwhile, the terms used herein are provided to only describe embodiments of the present invention and not for purposes of limitation. Unless the context clearly indicates otherwise, the singular forms include the plural forms. It will be understood that the terms "comprise" or "comprising" when used herein, specify some stated components or operations, but do not preclude the presence or addition of one or more other components, or operations.

Unless otherwise defined, all terms used herein can be used as is customary in the art to which this invention belongs. Also, It will be further understood that terms, such as those defined in commonly used dictionaries, will not be interpreted in an idealized or overly formal sense unless expressly so defined herein.

Hereinafter, a terminal and a method of releasing a locked state of a terminal according to embodiments will be described in detail with reference to FIG. 1 to FIG. 13.

Figure 1:
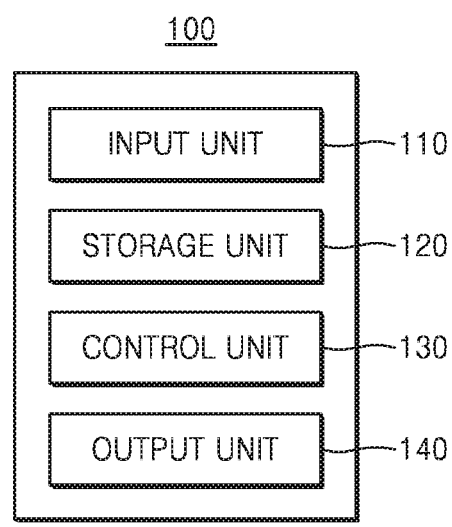
FIG. 1 is a block diagram illustrating a configuration of a terminal according to an embodiment.

FIG. 1 is a block diagram illustrating a configuration of a terminal 100 according to an embodiment. The terminal 100 may be, for example, a personal computer, a smartphone, a smart tablet, a mobile terminal or a portable electronic device. As illustrated in FIG. 1, the terminal 100 may include an input unit 110, a storage unit 120, a control unit 130, and an output unit 140.

The input unit 110 may receive an input from the outside. The input unit 110 may receive an input from a user of the terminal 100. The input unit 110 may be, for example, a button, a touch screen, a trackball, a camera, a keyboard, a mouse, or a fingerprint reader.

The input unit 110 may be a touch screen. The input unit 110 may receive a touch input from the user. When the terminal 100 is in a locked state, the user may input a touch input through the input unit 110 in order to release the locked state of the terminal 100. The user may input tapping or dragging as the touch input.

The storage unit 120 may store a password pattern. The password pattern may be input to the terminal 100 by the user of the terminal 100 in advance. The password pattern may correspond to a series of touch inputs input by the user. The storage unit 120 may store the input password pattern. The password pattern may be used to release the locked state of the terminal 100.

The storage unit 120 may be a volatile memory or a non-volatile memory. The storage unit 120 may be, for example, a flash memory, a ROM, a RAM, an EEROM, an EPROM, an EEPROM, a hard disk drive (HDD), or a register. The storage unit 120 may include, for example, a file system, a database, or an embedded database.

The control unit 130 may control whether a locked state of the terminal 100 is released. When the terminal 100 is in a locked state, the control unit 130 may compare the touch input received through the input unit 110 with the password pattern stored in the storage unit 120.

The control unit 130 may control whether a locked state of the terminal 100 is released according to the comparison result. When the received touch input corresponds to the stored password pattern according to the comparison result, the control unit 130 may release the locked state of the terminal 100. When the received touch input is the same as or similar to the stored password pattern according to the comparison result, the control unit 130 may release the locked state of the terminal 100.

On the other hand, when the received touch input does not correspond to the stored password pattern according to the comparison result, the control unit 130 may not release the locked state of the terminal 100. When the received touch input is not the same as the stored password pattern according to the comparison result, the control unit 130 may not release the locked state of the terminal 100. When the received touch input is not similar to the stored password pattern according to the comparison result, the control unit 130 may not release the locked state of the terminal 100.

The control unit 130 may control components of the terminal 100. The control unit 130 may be, for example, a central processing unit (CPU).

The output unit 140 may display different screens according to whether the terminal 100 is in a locked state. When the terminal 100 is in a locked state, the output unit 140 may display a lock screen. The lock screen may include a user interface through which the user is able to input a touch input in order to release the locked state of the terminal 100. When the terminal 100 is not in a locked state or is released from the locked state, the output unit 140 may display a screen different from the lock screen.

The output unit 140 may be a flat panel display, for example, a liquid crystal display (LCD), an organic light emitting diode (OLED), and a plasma display panel (PDP). Alternatively, the output unit 140 may be a curved display or a flexible display. The output unit 140 and the input unit 110 may be integrally formed as a touch screen or may be separately formed.

Figure 2:
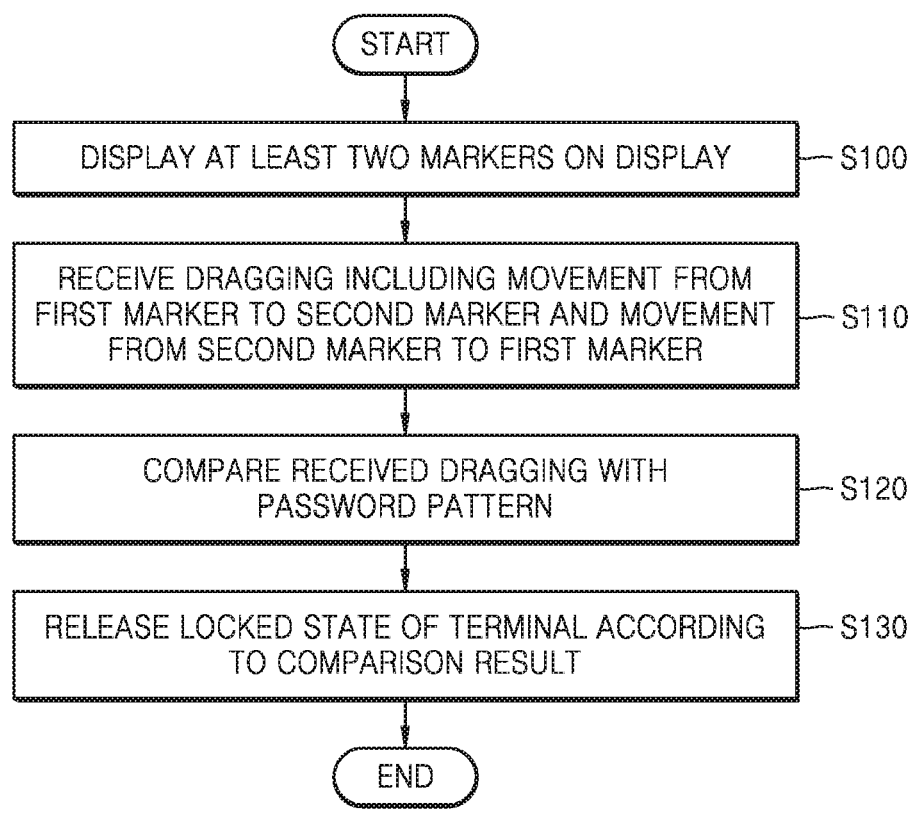
FIG. 2 is a flowchart illustrating processes of a method of releasing a locked state of a terminal according to a first embodiment.

FIG. 2 is a flowchart illustrating processes of a method of releasing a locked state of the terminal 100 according to a first embodiment. As illustrated in FIG. 2, in the method of releasing a locked state of the terminal 100 according to the first embodiment, first, an operation (S100) in which at least two markers are displayed on a display may be performed.

When the terminal 100 is in a locked state, a lock screen may be displayed on the display included in the output unit 140. The lock screen may include at least two markers. The lock screen may include at least two markers that are two-dimensionally arranged. The lock screen may include at least two grid points.

Figure 3:
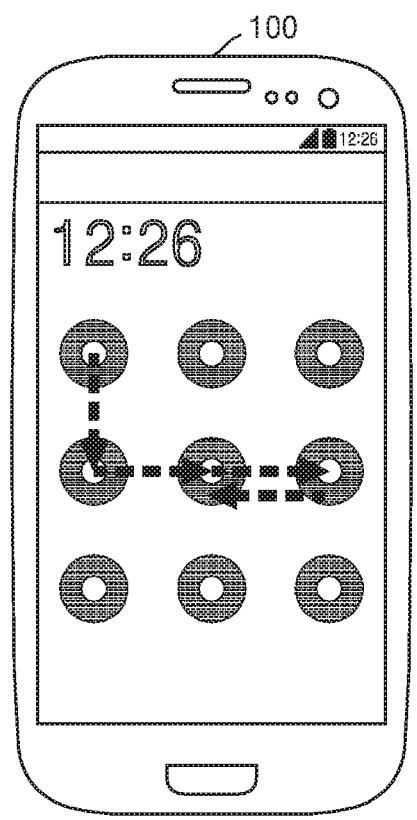
FIG. 3 is a plan view of a terminal for describing the method of releasing a locked state of a terminal according to the first embodiment.

FIG. 3 is a plan view of the terminal 100 for describing the method of releasing a locked state of the terminal 100 according to the first embodiment. As illustrated in FIG. 3, a lock screen displayed on the display may include markers that are arranged in a 3×3 grid.

Referring again to FIG. 2, next, an operation (S110) in which dragging is received may be performed. The user of the terminal 100 may input dragging through the input unit 110 of the terminal 100. The user may input dragging through the touch screen included in the input unit 110.

The dragging may indicate a finger trajectory from when the user's finger touches the touch screen until the finger is removed from the touch screen. The dragging may indicate a trajectory of a stylus pen from when the stylus pen is in contact with the touch screen until the stylus pen is removed from the touch screen.

The dragging may indicate a trajectory of a finger or a stylus pen between grid points displayed on the display. When the finger or the stylus pen passes a point that is within a specific distance from a specific grid point, the finger or the stylus pen may be considered to have passed the specific grid point.

For example, the user may input dragging illustrated in FIG. 3. As illustrated in FIG. 3, the input dragging may include four sequential movements. Each of the movements may be movement between grid points. In other words, the dragging may include movement from a grid point (1, 1) to a grid point (2, 1), movement from the grid point (2, 1) to a grid point (2, 2), movement from the grid point (2, 2) to a grid point (2, 3) and movement from the grid point (2, 3) to the grid point (2, 2).

In other words, the input dragging may include at least two movements between grid points. The input dragging may include first movement and second movement. Any of a start point and an end point of the first movement may be the same as any of a start point and an end point of the second movement.

For example, the start point of the first movement may be the same as the start point of the second movement. The end point of the first movement may be the same as the end point of the second movement. As another example, the start point of the first movement may be the same as the end point of the second movement, and the end point of the first movement may be the same as the start point of the second movement.

As illustrated in FIG. 3, the grid point (2, 2), which is a start point of the movement from the grid point (2, 2) to the grid point (2, 3), may be the same as the grid point (2, 2), which is an end point of the movement from the grid point (2, 3) to the grid point (2, 2). Also, the grid point (2, 3), which is an end point of the movement from the grid point (2, 2) to the grid point (2, 3), may be the same as the grid point (2, 3), which is a start point of the movement from the grid point (2, 3) to the grid point (2, 2).

Figure 4:
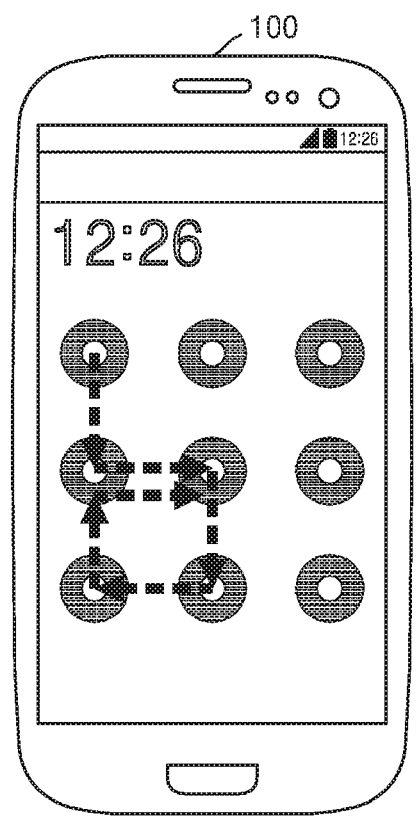
FIG. 4 is another plan view of a terminal for describing the method of releasing a locked state of a terminal according to the first embodiment.

FIG. 4 is another plan view of a terminal for describing the method of releasing a locked state of a terminal according to the first embodiment. As illustrated in FIG. 4, the user may input dragging. As illustrated in FIG. 4, the input dragging may include six sequential movements. Each of the movements may be movement between grid points. In other words, the dragging may include first movement from the grid point (1, 1) to the grid point (2, 1), second movement from the grid point (2, 1) to the grid point (2, 2), third movement from the grid point (2, 2) to the grid point (3, 2), fourth movement from the grid point (3, 2) to the grid point (3, 1), fifth movement from the grid point (3, 1) to the grid point (2, 1), and sixth movement from the grid point (2, 1) to the grid point (2, 2).

As illustrated in FIG. 4, the grid point (2, 1), which is a start point of the second movement, may be the same as the grid point (2, 1), which is a start point of the sixth movement. Also, the grid point (2, 2), which is an end point of the second movement, may be the same as the grid point (2, 2), which is an end point of the sixth movement.

When the user inputs dragging including at least one movement between grid points, the output unit 140 may display each of the movements. For example, when the input dragging includes movement from a first grid point to a second grid point, the output unit 140 may display a straight line connecting the first grid point and the second grid point.

Figure 5:
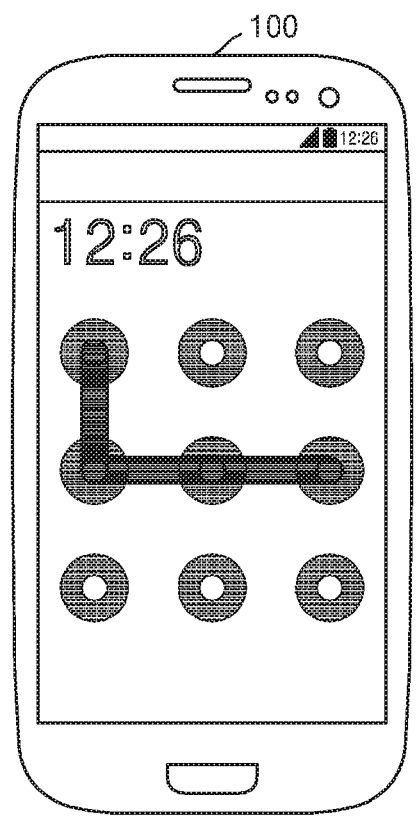
FIG. 5 is still another plan view of a terminal for describing the method of releasing a locked state of a terminal according to the first embodiment.

FIG. 5 is a still another plan view of the terminal 100 for describing the method of releasing a locked state of the terminal 100 according to the first embodiment. When the user inputs dragging illustrated in FIG. 3, the output unit 140 may output a screen as illustrated in FIG. 5. As illustrated in FIG. 5, a straight line connecting the grid point (1, 1) and the grid point (1, 2), a straight line connecting the grid point (1, 2) and the grid point (2, 2), and a straight line connecting the grid point (2, 2) and the grid point (2, 3) are displayed.

As illustrated in FIG. 3, the input dragging may include movement from the grid point (2, 2) to the grid point (2, 3) and movement from the grid point (2, 3) to the grid point (2, 2). The straight line corresponding to the movement from the grid point (2, 2) to the grid point (2, 3) and the straight line corresponding to the movement from the grid point (2, 3) to the grid point (2, 2) may be the same. Therefore, when the input dragging does not include movement from the grid point (2, 3) to the grid point (2, 2) among the four movements, the output unit 140 may output the screen illustrated in FIG. 5.

In other words, in the embodiment illustrated in FIG. 3, a screen displayed on the output unit 140 when a finger or a stylus pen is moved to the grid point (2, 3) may be the same as a screen displayed on the output unit 140 when the finger or the stylus pen is moved to the grid point (2, 2) thereafter. Accordingly, when the user inputs dragging in order to release the locked state of the terminal 100, if a person near the user steals a glance at the output unit 140 of the terminal 100, the person may not accurately recognize all movements included in the dragging.

Referring again to FIG. 2, next, an operation (S120) in which the received dragging is compared with a password pattern may be performed. The control unit 130 may compare the received dragging with the password pattern stored in the storage unit 120. The password pattern may be input by the user in advance and then stored. The password pattern may correspond to the dragging that is input by the user in advance.

The password pattern may include movement from a first marker to a second marker adjacent to the first marker and movement from the second marker to the first marker among markers displayed on the display. For example, the password pattern may correspond to the dragging illustrated in FIG. 3. The password pattern may include the movement from the grid point (2, 2) to the grid point (2, 3) and the movement from the grid point (2, 3) to the grid point (2, 2) among grid points illustrated in FIG. 3.

The control unit 130 may determine whether each movement included in the received dragging corresponds to each movement included in the password pattern. When each movement included in the received dragging is not in a one-to-one relationship with each movement included in the password pattern, the control unit 130 may determine that the received dragging does not correspond to the password pattern. When each movement included in the received dragging is in a one-to-one relationship with each movement included in the password pattern, the control unit 130 may determine that the received dragging corresponds to the password pattern.

Next, an operation (S130) in which the locked state of the terminal 100 is released according to the comparison result may be performed. When it is determined that the received dragging corresponds to the password pattern, the control unit 130 may release the locked state of the terminal 100. When it is determined that the received dragging does not correspond to the password pattern, the control unit 130 may maintain the locked state of the terminal 100.

Figure 6:
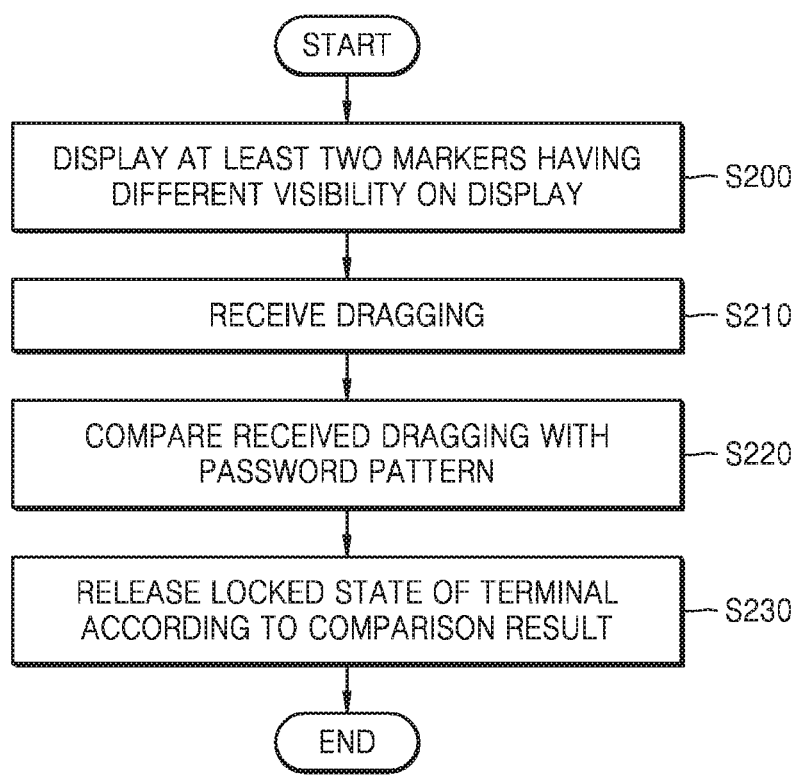
FIG. 6 is a flowchart illustrating processes of a method of releasing a locked state of a terminal according to a second embodiment.

FIG. 6 is a flowchart illustrating processes of a method of releasing a locked state of the terminal 100 according to a second embodiment. As illustrated in FIG. 6, in the method of releasing a locked state of the terminal 100 according to the second embodiment, first, an operation (S200) in which at least two markers having different visibility are displayed on the display may be performed.

Figure 7:
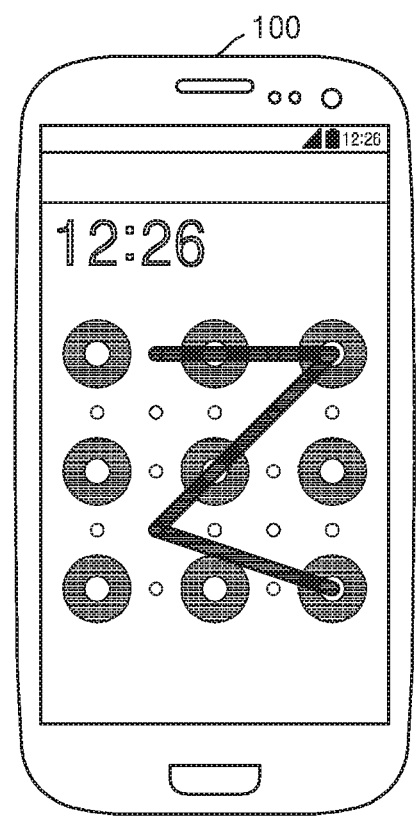
FIG. 7 is a plan view of a terminal for describing the method of releasing a locked state of a terminal according to the second embodiment.
Figure 8:
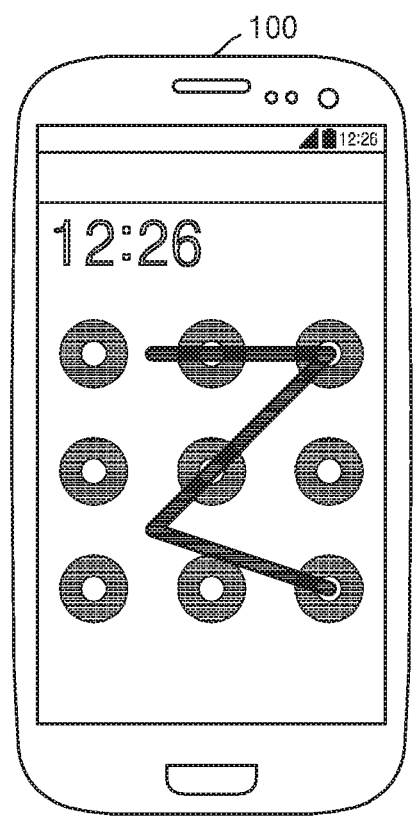
FIG. 8 is another plan view of a terminal for describing the method of releasing a locked state of a terminal according to the second embodiment.

FIG. 7 is a plan view of the terminal 100 for describing the method of releasing a locked state of the terminal 100 according to the second embodiment. Also, FIG. 8 is another plan view of a terminal for describing the method of releasing a locked state of a terminal according to the second embodiment. According to the second embodiment, a user interface included in the lock screen may include markers that are arranged in a 5×5 grid.

For example, in the operation (S100) in which at least two markers are displayed on the display, as illustrated in FIG. 7, 25 grid points in total including a grid point represented by two concentric circles and a grid point represented by only one circle may be displayed on the output unit 140. In other words, some of the markers displayed on the display may have a first form. Also, others of the markers displayed on the display may have a second form having different visibility from the first form. As illustrated in FIG. 7, the grid point represented by only one circle may be arranged between two adjacent grid points among grid points represented by two concentric circles.

Also, at least some grid points among grid points included in the user interface may not be displayed on the output unit 140. For example, as illustrated in FIG. 8, grid points represented by only one circle among grid points displayed in FIG. 7 may not be displayed on the output unit 140. In other words, some markers among markers displayed on the display may have different visibility from the other markers.

Referring again to FIG. 6, next, an operation (S210) in which dragging is received may be performed. As illustrated in FIG. 7 or FIG. 8, the user may input dragging. As illustrated in FIG. 7 or FIG. 8, the input dragging may include seven sequential movements. In other words, the input dragging may pass eight grid points in total.

When the user inputs dragging, the output unit 140 may display each of the movements. For example, as illustrated in FIG. 7 or FIG. 8, straight lines connecting start points and end points of the movements may be displayed.

As illustrated in FIG. 7, when some grid points are represented by two concentric circles and some grid points are represented by only one circle, a grid point through which a straight line representing input dragging passes may not be recognized accurately at a glance. Therefore, when a person near the user steals a glance at the output unit 140 of the terminal 100, the person may not accurately recognize all movements included in the dragging.

As illustrated in FIG. 8, when some grid points are displayed on the output unit 140 and some grid points are not displayed on the output unit 140, a grid point through which a straight line representing input dragging passes may not be recognized accurately at a glance. Therefore, when a person near the user steals a glance at the output unit 140 of the terminal 100, the person may not accurately recognize all movements included in the dragging.

Referring again to FIG. 6, next, an operation (S220) in which the received dragging is compared with a password pattern may be performed. Since the operation (S220) in which dragging is compared with a password pattern may correspond to the operation (S120) in which dragging is compared with a password pattern described above, details thereof will not be described.

Next, an operation (S230) in which the locked state of the terminal 100 is released according to the comparison result may be performed. Since the operation (S230) in which the locked state of the terminal 100 is released may correspond to the operation (S130) in which the locked state of the terminal 100 is released described above, details thereof will not be described.

Figure 9:
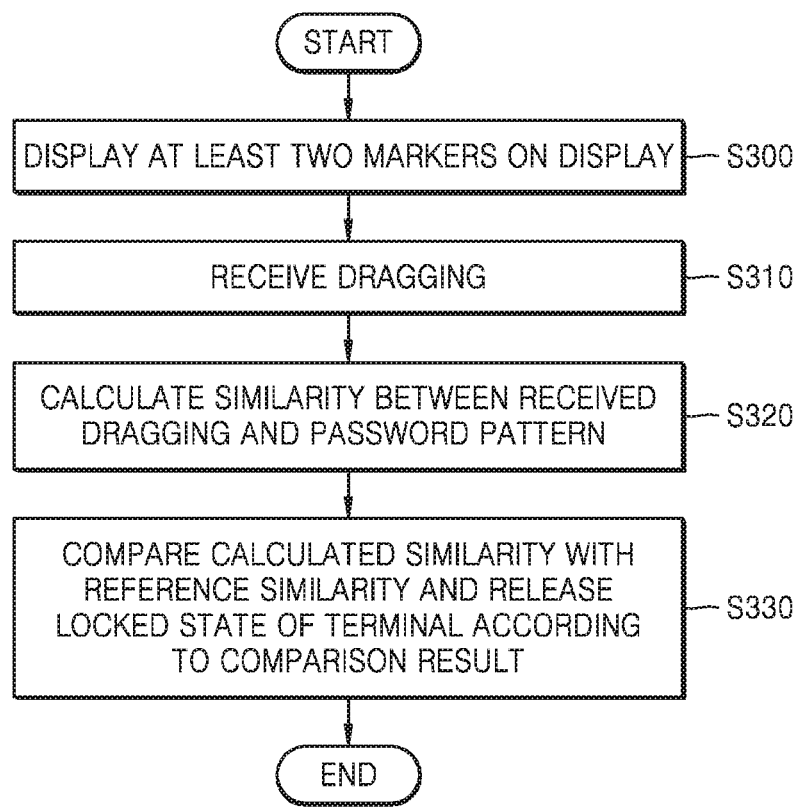
FIG. 9 is a flowchart illustrating processes of a method of releasing a locked state of a terminal according to a third embodiment.

FIG. 9 is a flowchart illustrating processes of a method of releasing a locked state of the terminal 100 according to the third embodiment. As illustrated in FIG. 9, in the method of releasing a locked state of the terminal 100 according to the third embodiment, first, an operation (S310) in which at least two markers are displayed on the display may be performed.

Figure 10:
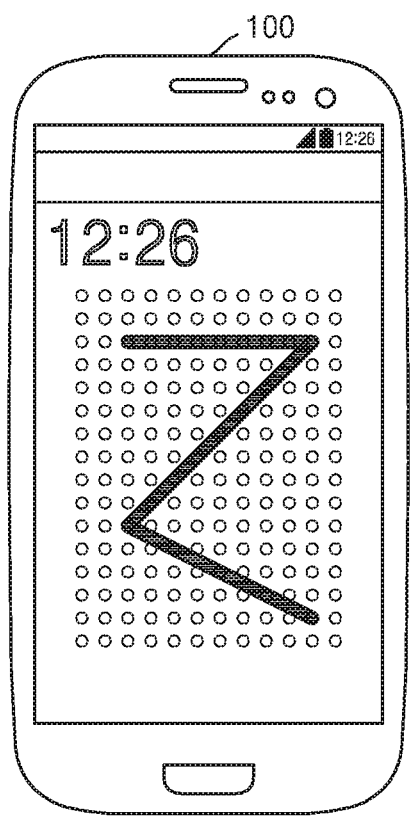
FIG. 10 is a plan view of a terminal for describing the method of releasing a locked state of a terminal according to the third embodiment.

FIG. 10 is a plan view of the terminal 100 for describing the method of releasing the locked state of the terminal 100 according to the third embodiment. According to the third embodiment, a user interface included in the lock screen may include markers that are arranged in an m×n (where m>=10, n>=10) grid. For example, in the operation (S100) in which at least two markers are displayed on the display, as illustrated in FIG. 10, markers arranged in a 16×12 grid may be displayed on the output unit 140.

Referring again to FIG. 9, next, an operation (S310) in which dragging is received may be performed. The user may input dragging illustrated in FIG. 10. As illustrated in FIG. 10, the input dragging may include sequential movements forming a "Z" shape. In other words, the input dragging may correspond to a trajectory from a start point on the top left to an end point on the bottom right. The trajectory may include at least two grid points.

Referring again to FIG. 9, next, an operation (S320) in which similarity between the received dragging and the password pattern is calculated may be performed. The control unit 130 may compare the received dragging with the password pattern stored in the storage unit 120. The control unit 130 may calculate similarity between the received dragging and the stored password pattern.

The control unit 130 may calculate the similarity using at least one of a direction of each movement included in the received dragging, a position of each grid point through which the received dragging passes, and the number of grid points through which the received dragging passes. In other words, the control unit 130 may calculate the similarity using at least one of a direction of a trajectory that corresponds to the received dragging, a position of each grid point included in the trajectory, and the number of grid points included in the trajectory.

For example, the control unit 130 may calculate first similarity between a distribution of directions of movements included in the received dragging and a distribution of directions of movements included in the password pattern. Also, the control unit 130 may calculate second similarity between a distribution of positions of grid points through which the received dragging passes and a distribution of positions of grid points included in the password pattern. Also, the control unit 130 may compare the number of grid points through which the received dragging passes with the number of grid points included in the password pattern and thus calculate third similarity. Also, the control unit 130 may calculate a weighted sum of the first similarity, the second similarity, and the third similarity and thus calculate similarity between the received dragging and the stored password pattern.

Next, an operation (S330) in which the calculated similarity is compared with reference similarity, and the locked state of the terminal 100 is released according to the comparison result may be performed. When the calculated similarity is equal to or greater than the reference similarity, the control unit 130 may determine that the received dragging corresponds to the password pattern. When it is determined that the received dragging corresponds to the password pattern, the control unit 130 may release the locked state of the terminal 100. On the other hand, when the calculated similarity is less than the reference similarity, the control unit 130 may determine that the received dragging does not correspond to the password pattern. When it is determined that the received dragging does not correspond to the password pattern, the control unit 130 may maintain the locked state of the terminal 100.

When dragging is input as illustrated in FIG. 10, characteristics of the dragging may not be recognized at a glance. Therefore, even when a person near the user steals a glance at the output unit 140 of the terminal 100, the person may not recognize characteristics of the dragging accurately.

Figure 11:
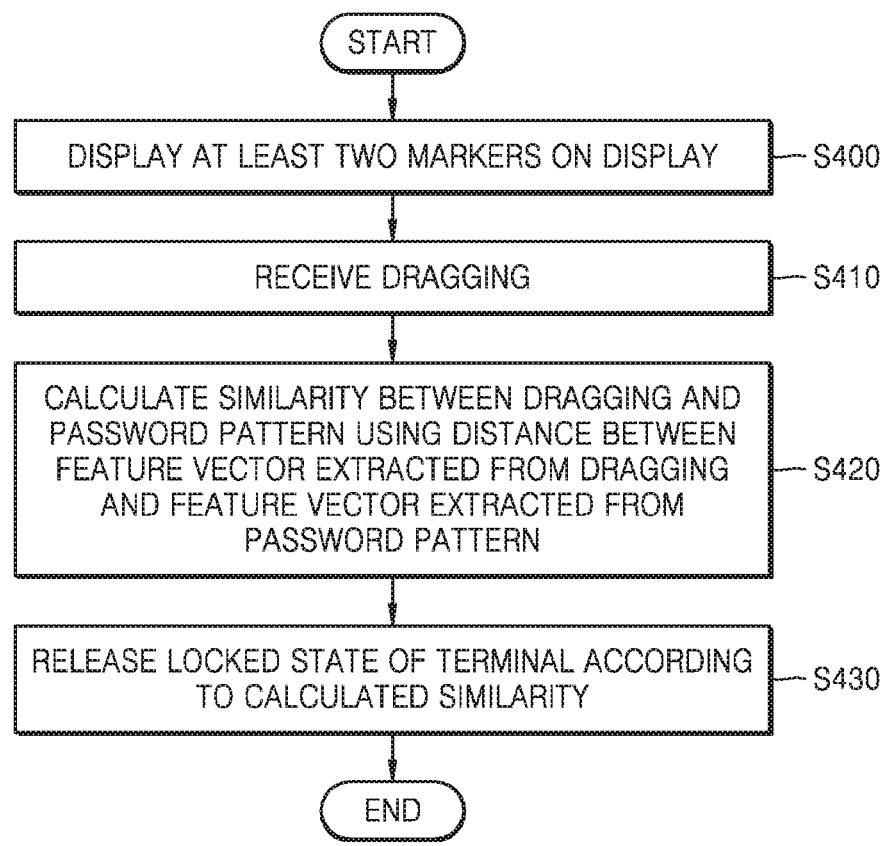
FIG. 11 is a flowchart illustrating processes of a method of releasing a locked state of a terminal according to a fourth embodiment.

FIG. 11 is a flowchart illustrating processes of a method of releasing a locked state of the terminal 100 according to a fourth embodiment. As illustrated in FIG. 11, in the method of releasing a locked state of the terminal 100 according to the fourth embodiment, first, an operation (S400) in which at least two markers are displayed on the display may be performed.

Figure 12:
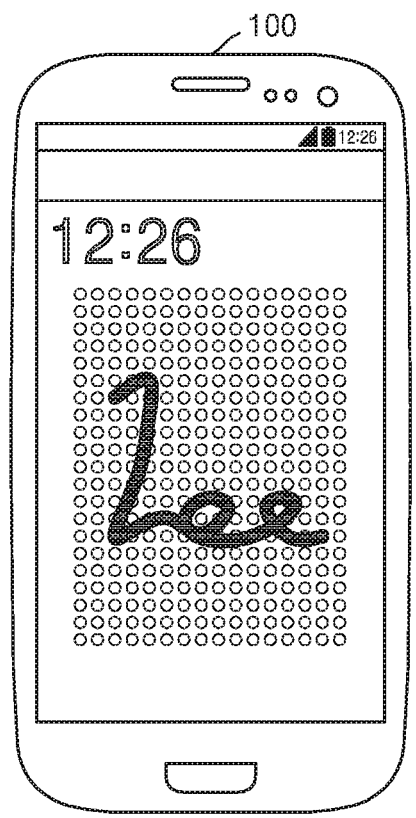
FIG. 12 is a plan view of a terminal for describing the method of releasing a locked state of a terminal according to the fourth embodiment.
Figure 13:
FIG. 13 is another plan view of the terminal for describing the method of releasing a locked state of a terminal according to the fourth embodiment.

FIG. 12 is a plan view of the terminal 100 for describing the method of releasing a locked state of the terminal 100 according to the fourth embodiment. FIG. 13 is another plan view of the terminal 100 for describing the method of releasing a locked state of the terminal 100 according to the fourth embodiment. According to the fourth embodiment, a user interface included in the lock screen may include markers that are arranged in an m×n (where m>=100, n>=100) grid.

For example, in the operation (S100) in which at least two markers are displayed on the display, as illustrated in FIG. 12, markers arranged in an m×n grid may be displayed on the output unit 140. Also, at least some grid points among grid points included in the user interface may not be displayed on the output unit 140. For example, as illustrated in FIG. 13, all grid points displayed in FIG. 12 may not be displayed on the output unit 140.

Referring again to FIG. 11, next, an operation (S410) in which dragging is received may be performed. The user may input dragging illustrated in FIG. 12 or FIG. 13. As illustrated in FIG. 12 or FIG. 13, the user may include sequential movements forming a signature of the user.

Referring again to FIG. 11, next, an operation (S420) in which a distance between a feature vector extracted from the dragging and a feature vector extracted from the password pattern is used to calculate similarity between the dragging and the password pattern may be performed. The control unit 130 may compare the received dragging with the password pattern stored in the storage unit 120. The control unit 130 may calculate similarity between the received dragging and the stored password pattern.

The control unit 130 may use a distance between a feature vector extracted from the received dragging and a feature vector extracted from the stored password pattern to calculate similarity between the received dragging and the stored password pattern. For example, when the distance between the feature vector extracted from the received dragging and the feature vector extracted from the stored password pattern is great, the similarity between the received dragging and the stored password pattern may be low. On the other hand, when the distance between the feature vector extracted from the received dragging and the feature vector extracted from the stored password pattern is small, similarity between the received dragging and the stored password pattern may be high.

Next, an operation (S430) in which the locked state of the terminal 100 is released according to the calculated similarity may be performed. When the calculated distance between feature vectors is equal to or smaller than a reference distance, the control unit 130 may determine that the received dragging corresponds to the password pattern. When it is determined that the received dragging corresponds to the password pattern, the control unit 130 may release the locked state of the terminal 100. On the other hand, when the calculated distance between feature vectors is greater than the reference distance, the control unit 130 may determine that the received dragging does not correspond to the password pattern. When it is determined that the received dragging does not correspond to the password pattern, the control unit 130 may maintain the locked state of the terminal 100.

When dragging is input as illustrated in FIG. 12 or FIG. 13, characteristics of the dragging may not be recognized at a glance. Therefore, even when a person near the user steals a glance at the output unit 140 of the terminal 100, the person may not recognize characteristics of the dragging accurately.

According to the embodiments described above, it is possible to improve security of the terminal. In addition, even when a person steals a password that the user inputs in order to release the locked state of the terminal, the person may not easily recognize the password.

The embodiments of the present invention have been described above with reference to the drawings. It will be understood by those skilled in the art that various modifications can be made without departing from the scope of the present invention and without changing essential features. Therefore, the above-described examples should be considered in a descriptive sense only and not for purposes of limitation.

REFERENCE NUMERALS

100 terminal
110 input unit
120 storage unit
130 control unit
140 output unit

The invention claimed is:

1. A terminal comprising:
   a display;
   an input unit configured to receive dragging input;
   a storage unit configured to store a password pattern; and
   a processor configured to:
   control to display at least a part of a user interface including at least two markers arranged in a grid on the display if a state of the terminal is locked, and
   in response to receiving dragging input on the displayed at least a part of a user interface, release a locked state of the terminal by comparing the received dragging input and the stored password pattern,
   wherein the user interface includes a first marker and a second marker having different visibility from the first marker, and the stored password pattern includes movement from the first marker to the second marker and movement from the second marker to the first marker.

2. The terminal according to claim 1, wherein the first marker has a first form and the second marker has a second form that is different from the first form.

3. The terminal according to claim 1, wherein the user interface includes the at least two first markers that are arranged in a grid and the user interface includes the second marker that is arranged between two adjacent first markers among the first markers.

4. The terminal according to claim 1, wherein the processor controls to display both the first marker and the second marker.

5. The terminal according to claim 1, wherein the processor controls to display one of the first marker and the second marker, and not display the other of the first marker and the second marker.

6. The terminal according to claim 2, wherein the user interface includes markers that are arranged in a 5×5 grid.

7. The terminal according to claim 2, wherein one of the first marker and the second marker includes two concentric circles and the other of the first marker and the second marker includes one circle.

8. A method of releasing a locked state of a terminal, comprising:
   storing a password pattern;
   displaying at least a part of a user interface including at least two markers arranged in a grid on a display if a state of the terminal is locked;
   receiving dragging input on the displayed at least a part of a user interface; and
   releasing a locked state of the terminal by comparing the received dragging input with the stored password pattern,
   wherein the user interface includes a first marker and a second marker having different visibility from the first marker, and the stored password pattern includes movement from the first marker to the second marker and movement from the second marker to the first marker.

9. A method of the claim 8, wherein the first marker has a first form and the second marker has a second form that is different from the first form.

10. A method of the claim 8, wherein the user interface includes the at least two first markers that are arranged in a grid and the user interface includes the second marker that is arranged between two adjacent first markers among the first markers.

11. A method of the claim 8, wherein the displaying at least a part of a user interface includes displaying both the first marker and the second marker.

12. A method of the claim 8, wherein the displaying at least a part of a user interface includes displaying one of the first marker and the second marker, and not displaying the other of the first marker and the second marker.

13. A method of the claim 8, wherein the user interface includes markers that are arranged in a 5×5 grid.

14. A method of the claim 8, wherein one of the first marker and the second marker includes two concentric circles and the other of the first marker and the second marker includes one circle.

15. A non-transitory computer-readable recording medium having recorded thereon a program, which, when executed by a computer, causes the computer to perform the method of claim 8.

* * * * *